United States Patent
Nakanishi (12)

(10) Patent No.: US 6,512,314 B1
(45) Date of Patent: Jan. 28, 2003

(54) STEPPING MOTOR HAVING CHARACTERISTICS OF AN INERTIA DAMPER

(75) Inventor: Motoyasu Nakanishi, Shizuoka-ken (JP)

(73) Assignee: Kabushiki Kaisha Sigel, Tokyo (JP)

( * ) Notice: Subject to any disclaimer, the term of this patent is extended or adjusted under 35 U.S.C. 154(b) by 42 days.

(21) Appl. No.: 09/699,686

(22) Filed: Oct. 31, 2000

Related U.S. Application Data (63) Continuation of application No. 09/330,002, filed on Jun. 11, 1999, which is a continuation of application No. 09/152,794, filed on Sep. 14, 1998, now abandoned, which is a continuation of application No. 08/938,946, filed on Sep. 17, 1997, now abandoned, which is a continuation of application No. 08/717,441, filed on Sep. 20, 1996, now abandoned, which is a continuation of application No. 08/542,657, filed on Oct. 13, 1995, now abandoned, which is a continuation of application No. 08/366,407, filed on Dec. 29, 1994, now abandoned, which is a continuation of application No. 08/215,391, filed on Mar. 21, 1994, now abandoned, which is a continuation of application No. 08/093,904, filed on Jul. 20, 1993, now abandoned, which is a continuation of application No. 07/953,827, filed on Sep. 30, 1992, now abandoned, which is a continuation of application No. 07/807,935, filed on Dec. 16, 1991, now abandoned, which is a continuation of application No. 07/638,523, filed on Jan. 10, 1991.

(30) Foreign Application Priority Data

Jan. 17, 1990 (JP) .............................................. 2-007785
Aug. 13, 1990 (JP) .............................................. 2-213928

(51) Int. Cl.$^7$ .............................................. H02K 37/00
(52) U.S. Cl. .................................................... 310/49 R
(58) Field of Search ................................ 310/49 R, 51, 310/194, 260; 74/574; 181/207, 208, 209

(56) References Cited

U.S. PATENT DOCUMENTS

| | | | |
|---|---|---|---|
| 1,688,891 A | | 10/1928 | Spreen |
| 2,220,751 A | | 11/1940 | Bergman |
| 3,693,035 A | | 9/1972 | Ostwald |
| 3,890,514 A | | 6/1975 | Mutz et al. |
| 4,386,288 A | | 5/1983 | Laurie |
| 4,438,361 A | | 3/1984 | Manson |
| 4,471,248 A | | 9/1984 | Smetana |
| 4,559,461 A | | 12/1985 | Takahashi et al. |
| 4,617,484 A | | 10/1986 | Buijsen |
| 4,623,812 A | | 11/1986 | van de Griend |
| 4,825,983 A | | 5/1989 | Nakanishi |
| 5,076,403 A | * | 12/1991 | Mitsui |
| 5,317,552 A | | 5/1994 | Yamasaki |
| 5,450,931 A | | 9/1995 | Masuda et al. |
| 5,720,118 A | | 2/1998 | Mayer et al. |

FOREIGN PATENT DOCUMENTS

| | | |
|---|---|---|
| DE | 1 037 572 | 8/1958 |
| DE | 1 613 396 | 12/1971 |
| DE | 2 050 117 | 4/1972 |
| DE | 24 09 856 | 11/1975 |
| EP | 0 283234 | 9/1988 |
| JP | 52-64603 | 5/1977 |
| US | 641602 | 1/1979 |

* cited by examiner

*Primary Examiner*—Edward H. Tso
(74) *Attorney, Agent, or Firm*—Wenderoth, Lind & Ponack, L.L.P.

(57) ABSTRACT

A stepping motor is capable of exhibiting a function as an inertia damper as well as its primary function. The stepping motor includes a gel element arranged in one or both of a space between a casing and a stator and a space between an output shaft of the motor and a rotor, resulting in vibration generated at the time of starting of the stepping motor being effectively absorbed.

20 Claims, 6 Drawing Sheets

FIG. 12

STEPPING MOTOR HAVING CHARACTERISTICS OF AN INERTIA DAMPER

This application is a continuation of application Ser. No. 09/330,002 filed on Jun. 11, 1999, which in turn is a continuation of now abandoned application Ser. No. 09/152, 794, filed Sep. 14, 1998, which in turn is a continuation of Ser. No. 08/938,946, filed Sep. 17, 1997 now abandoned, which in turn is a continuation of now abandoned application Ser. No. 08/717,441, filed Sep. 20, 1996 now abandoned, which in turn is a continuation of now abandoned application Ser. No. 08/542,657 filed on Oct. 13, 1995, which in turn is a continuation of now abandoned application Ser. No. 08/366,407, filed Dec. 29, 1994, which in turn is a continuation of now abandoned application Ser. No. 08/215,391, filed Mar. 21, 1994, which in turn is a continuation of now abandoned application Ser. No. 08/093, 904, filed Jul. 20, 1993, which in turn is a continuation of now abandoned application Ser. No. 07/953,827, filed Sep. 30, 1992, which in turn is a continuation of now abandoned Ser. No. 07/807,935 filed Dec. 16, 1991 which in turn is a continuation of now abandoned application Ser. No. 07/638, 523 filed Jan. 10, 1991.

BACKGROUND OF THE INVENTION

This invention relates to a stepping motor widely used as a drive source for office automation equipment, various kinds of automatic production units or the like, and more particularly to an inertial damper structure for a stepping motor which is adapted to converge vibration of the stepping motor and reduce instability of the stepping motor during the step response of the stepping motor.

A stepping motor exhibits excellent functions such as accurate driving, rapid stopping, rapid starting and the like. On the other hand, it has disadvantages in that the transient response during acceleration at the time of starting of rotation is apt to be vibratory, and unstable phenomena such as resonance in a fixed frequency domain of a drive power supply and the like fail to permit the rotation of the motor to be smoothly carried out. Accordingly, in order to properly drive equipment by means of the stepping motor, a mechanism for eliminating such disadvantages as described above is necessarily required. In view of the foregoing, the inventor developed an inertia damper utilizing a gel material while taking notice of the fact that it exhibits good vibration absorbing characteristics. The proposed inertia damper generally includes a mount base, an inertia weight element and a gel element, wherein the mount base and inertia weight element are coupled to each other through the gel element in a vibration absorbing manner and the mount base is mounted on an output shaft of a motor.

Figure 1:
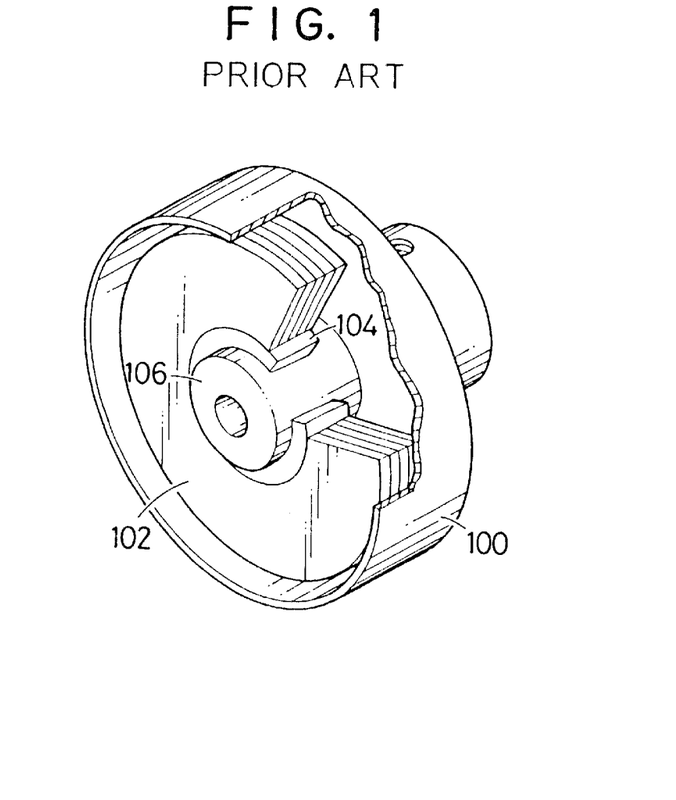
FIG. 1 is a partly cut away perspective view showing a conventional inertia damper for a stepping motor.

Now, an inertia damper of this type which is currently used will be described hereinafter with reference to FIG. 1. The inertia damper includes a mount base 100, an inertia weight component or element 102 and a gel material or element 104 and is constructed in such a manner that the mount base 100 and inertia weight element 102 are connected to each other in a vibration absorbing manner through the gel element 104 arranged between the inner peripheral surface of the inertia weight element 102 formed into an annular shape and a boss 106 of the mount base 100. Thus, in the conventional inertia damper constructed as described above, a space in which the gel element 104 is arranged is of relatively small dimensions, so that the gel element 104 may very satisfactorily absorb vibration of a small magnitude. However, such construction fails to cause the gel element 104 to satisfactory absorb vibration of a large magnitude, as well as exhibit good endurance under the operating conditions that a large amount of vibration energy is applied thereto.

Also, the inertia damper is conventionally mounted as a separate element on the stepping motor, therefore, it is required to provide the motor with a mounting shaft extending from one side of the motor in one direction for mounting the inertia damper on the motor therethrough as well as an output shaft in the opposite direction. However, in order to prevent the structure of the stepping motor from being complicated, it is desired to eliminate such a mounting shaft as described above. Thus, it is desirable to provide a stepping motor which is provided with an inertia damper in a manner to be incorporated in the stepping motor rather than as a separate element.

SUMMARY OF THE INVENTION

The present invention has been made in view of the foregoing disadvantage of the prior art.

Accordingly, it is an object of the present invention to provide a stepping motor which is capable itself of exhibiting a function of an inertia damper.

It is another object of the present invention to provide a stepping motor which is capable of improving responsiveness and the elimination of instability during operation.

It is a further object of the present invention to provide a stepping motor which is capable of exhibiting satisfactory endurance under various operating conditions.

It is still another object of the present invention to provide a stepping motor which is capable of exhibiting excellent characteristics while remaining compact in size.

It is yet another object of the present invention to provide a stepping motor which is easily assembled and which has an uncomplicated structure.

It is a still further object of the present invention to provide a stepping motor which is capable of exhibiting satisfactory performance while keeping the structure significantly compact.

In accordance with one aspect of the present invention, a stepping motor is provided. The stepping motor comprises a casing, an output shaft arranged so as to extend outwardly from the casing, a rotor arranged in the casing and connected to the output shaft in the casing, and a stator substantially stationarily arranged in the casing and including at least one stator core and an excitation coil. The stepping motor also includes a gel element which is arranged in at least one of at least a part of a space defined between the casing and the stator and at least a part of a space defined between the output shaft and the rotor.

In the present invention, the construction in which the gel element is arranged in at least a part of the space between the casing and the stator is such that the gel element may be pro-vided in the entire space between the casing and the stator or a part of the space. Alternatively, the gel element may be arranged in at least a part of a space(s) between or in components for constituting at least one of the casing and the stator. Also, the construction in which the gel element is arranged in at least a part of the space between the output shaft and the rotor is such that the gel element may be arranged in the entire space between the output shaft and the rotor or a part of the space. Alternatively, the gel element may be arranged in at least a part of a space(s) between or in components for constituting at least one of the output shaft and the rotor.

In the present invention, the gel element may be directly or indirectly arranged. In the present invention, the construction in which the gel element is directly arranged is such that it is arranged without using any interstitial or intermediate member or element and the construction in which the gel element is indirectly arranged is such that it is arranged through an interstitial or intermediate member or element.

The stepping motor of the present invention constructed as described above permits the gel element to function to absorb vibration, such that in the stepping motor exhibits characteristics of an inertial damper.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, a stepping motor according to the present invention will be described hereinafter with reference to FIGS. 2 to 12, wherein like reference numerals designate like or corresponding parts throughout.

First, types of a stepping motor to which the present invention is directed will be described hereinafter.

Stepping motors are generally classified as PM, VR or HB type stepping motors, depending upon the structure of a magnetic circuit thereof. The PM type stepping motor includes a rotor comprising a permanent magnet of a cylindrical shape and a stator core having excitation coils arranged around the rotor. The VR type stepping motor includes a rotor formed of a material of high magnetic permeability into a gear-like salient pole and a gear-like stator arranged around the rotor. Also, the HB type stepping motor is constructed such that the features of the PM type and VR type stepping motors are united, wherein a gear-like stator is arranged around a rotor, which comprises a combination of a gear-like salient pole and a permanent magnet magnetized in the axial direction of an output shaft of the motor. The present invention may be applied to various kinds of stepping motors including the above-described three types of stepping motors.

Figure 2:
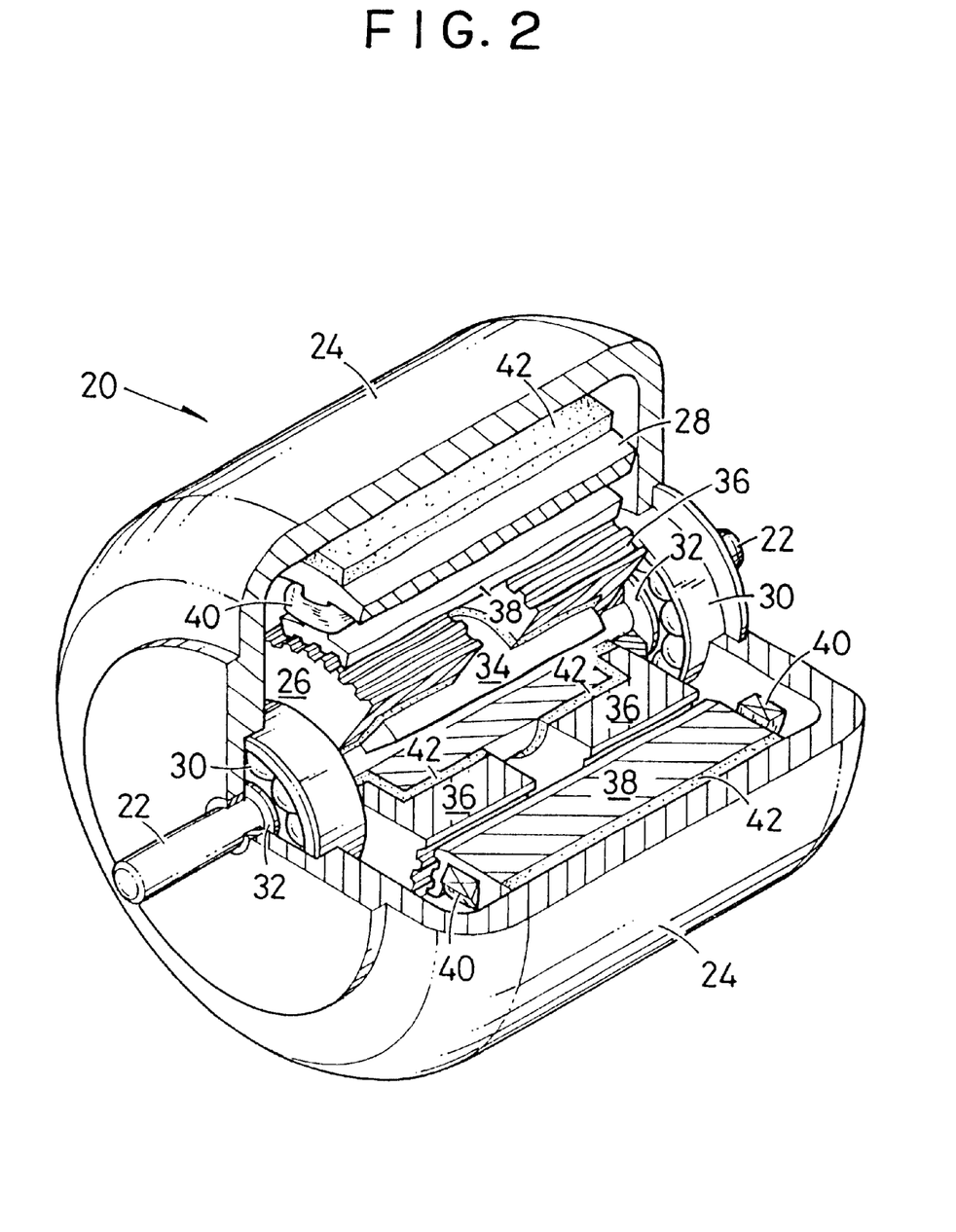
FIG. 2 is a partially cut away perspective view showing an embodiment of a stepping motor according to the present invention, which is embodied in the form of an HB type stepping motor.
Figure 3:
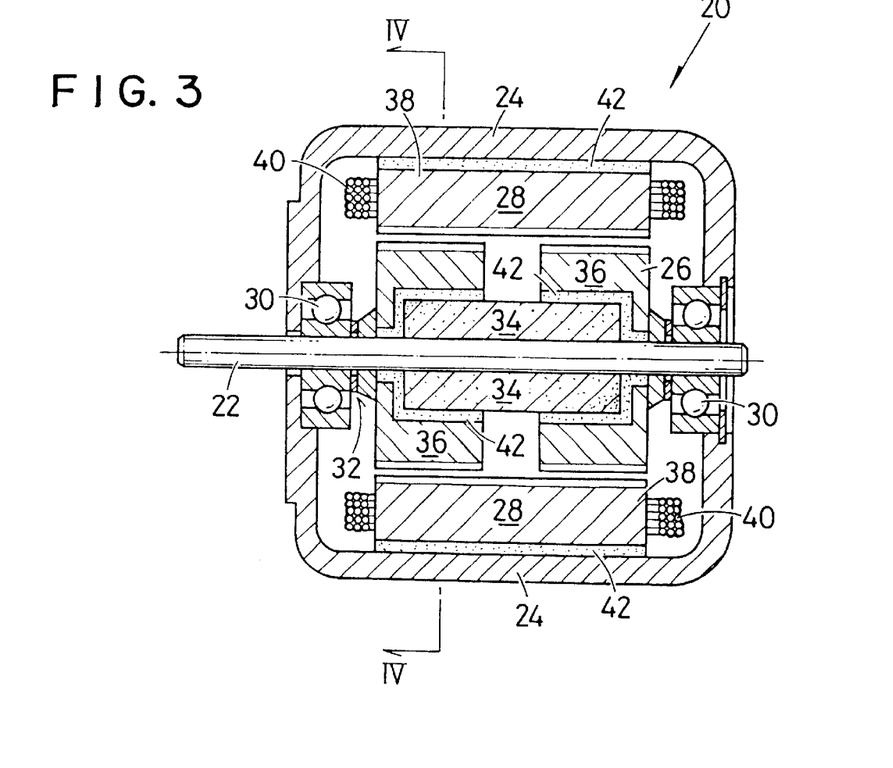
FIG. 3 is a vertical-sectional side elevation view of the stepping motor shown in FIG. 2.
Figure 4:
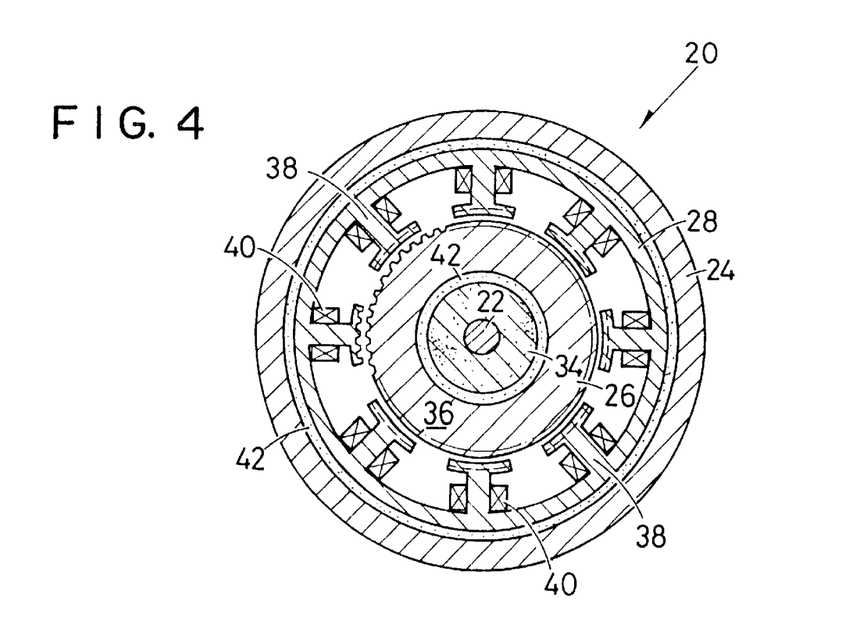
FIG. 4 is a sectional view taken along line IV—IV of FIG. 3.

FIGS. 2 to 4 show an embodiment of a stepping motor according to the present invention, which is embodied in the form of an HB type stepping motor. An HB stepping motor of the illustrated embodiment which is generally designated by reference numeral 20 includes an output shaft 22 and a casing 24 formed into a substantially cylindrical shape. The output shaft 22 is arranged so as to extend outwardly through the casing 24. In the casing 24 are arranged a rotor 26 connected to or mounted on the output shaft 22 and a stator 28 fixed on the inner surface of the casing 24. The output shaft 22 is rotatably supported at the casing 24 through bearings 30 provided at the casing 24. In the illustrated embodiment, each of the bearings 30 may comprise a ball bearing and is stabilized by applying a pre-load of a suitable magnitude thereto by means of washers 32. The rotor 26 functions to convert magnetic energy generated between the rotor 26 and the stator 28 into rotational energy. For this purpose, in the illustrated embodiment, the rotor 26 includes a rotor magnet 34 of a cylindrical shape which is magnetized in the axial direction of the output shaft 22, and a pair of gear-like rotor cores 36 arranged on both ends of the rotor magnet 34 so as to surround the rotor magnet and be shifted in phase by a 1/2 pitch from each other. The stator 28 includes a stator core 38 and excitation coils 40 wound on the stator core 38. The stator core 38 is arranged so as to be spaced by a small distance from the rotor core 36.

In the so-constructed HB type stepping motor 20, a gel element, as indicated at reference numeral 42, may be arranged in at least a part of a space defined between the casing 24 and the stator 28 and/or at least a part of a space defined between the output shaft 22 and the rotor 26 mounted on the output shaft 22, so that it may function as an inertia damper for absorbing vibration. Such arrangement of the gel element may be directly or indirectly carried out. More particularly, the statement that the gel element 42 is arranged in at least a part of the space between the casing 24 and the stator 28 means that the gel element 42 may be interposed in the overall space between the casing 24 and the stator 28 or a part of the space. Alternatively, this means that the gel element 42 may be inter-posed in at least a part of a space(s) between or in components for constituting the casing 24 and/or stator 28. Also, the statement that the gel element 42 is arranged in at least a part of the space between the output shaft 22 and the rotor 26 means that the gel element 42 may be inter-posed in the overall space between the output shaft 22 and the rotor 26 or a part of the space. Alternatively, this means that the gel element 42 may be inter-posed in at least a part of a space(s) between or in components for constituting the output shaft 22 and/or rotor 26. Further, the construction that the gel element 42 is directly arranged means that it is arranged without using any interstitial or intermediate member or element, and the statement that the gel element 42 is indirectly arranged means that it is arranged through an interstitial or intermediate member or element.

In the embodiment shown in FIGS. 2 to 4, the gel element 42 is inter-posed in each of the whole space between the casing 24 and the stator 28 and the whole space between the rotor 26 and the output shaft 22. Also, the gel element 42 is directly arranged without using any interstitial or intermediate element. Further, in connection with the gel element 42 arranged between the rotor 26 and the output shaft 22, a part of the gel element is arranged between the output shaft 22 and the rotor cores 36 which are one of components for the rotor 26 and the remaining part of the gel element is arranged between the rotor cores 36 and the rotor magnet 34 which is the other component for the rotor 26.

Now, the gel element 42 will be described hereinafter. A gel material suitable for use in forming the gel element 42 may be selected from the group consisting of urethane gel, acrylic gel and any other suitable gel materials. In the illustrated embodiment, silicone gel is used as a material for the gel element 42 because it exhibits stable characteristics over a wide temperature range, does not produce any by-product during the curing step and exhibits excellent vibration absorbing performance. Silicone gel consists of dimethyl siloxane units and may be a silicone polymer of the addition reaction type prepared by curing a mixture consisting of components A and B described below. The component A is diorganopolysiloxane of the following general formula (I)

$$RR^1{}_2SiO\text{—}(R^2{}_2SiO)_n SiR^1{}_2R \qquad (I)$$

wherein R designates an alkenyl group, $R^1$ represents a monovalent hydrocarbon group free of any aliphatically unsaturated bond, $R^2$ is a monovalent hydrocarbon group containing a methyl group of at least 50 mol % and, if contained, an alkenyl group of 10 mol % or less and n is a number which is sufficient to permit the viscosity of the component at a temperature of 25° C. to be within the range of from 100 cSt to 100,000 cSt. The component B is organohydrogen polysiloxane which has a viscosity of 5000 cSt or less at a temperature of 25° C. and has at least three combinations of a Si atom and a hydrogen atom(s) directly bonded to the Si atom in one molecule. The so-prepared mixture is adjusted to cause a ratio (molar ratio) of the total amount or number of alkenyl groups contained in the component A to the total amount or number of hydrogen atoms directly bonded to the Si atoms of the component B to be within the range of from 0.1 to 2.0.

Now, the silicone gel will be described in more detail hereinafter. The above-described component A is a compound which has a straight-chain molecular structure and permits each of the alkenyl groups R at both ends or terminals of the molecule to addition-react with the hydrogen atom(s) directly bonded to the Si atoms of the component B to form a crosslinked structure. The alkenyl groups at both terminals of the molecule each are preferably a lower alkenyl group and more preferably a vinyl group in view of its reactivity. The group $R^1$ at each terminal of the molecule is a monovalent hydrocarbon group free of any aliphatically unsaturated bond and includes, for example, a alkyl group such as a methyl group, a propyl group or a hexyl group, a phenyl group and a fluoroalkyl group and the like.

In the formula (I) described above, the group $R^2$ is a monovalent aliphatic hydrocarbon group and includes, for example, an alkyl group such as a methyl group, a propyl group or a hexyl group, a lower alkenyl group such as a vinyl group, and the like. The group $R^2$ contains a methyl group in an amount of at least 50 mol %. The group $R^2$ may contain an alkenyl group and, in this case, the amount of alkenyl group is preferably 10 mol % or less. The amount of alkenyl group above 10 mol % causes the crosslink density to be excessively increased, resulting in the viscosity of the component A being excessively increased. The value of n is determined so as to permit the viscosity of the component A at a temperature of 25° C. to be within the range of from 100 cSt to 100,000 cSt and preferably from 200 cSt to 20,000 cSt.

The above-described component B acts as a crosslinking agent for the component A. The hydrogen atoms directly bonded to the Si atoms of the component B are addition-reacted with alkenyl groups of the component A to effect curing of the component A. The component B which is merely required to exhibit the above-described function may have any molecular structure such as a straight-chain structure, a branched chain structure, a cyclic structure, a network structure or the like. To the silicon atoms of the component B may be bonded organic groups in addition to hydrogen atoms. The organic group is normally a lower alkyl group such as a methyl group. The viscosity of the component B at a temperature of 25° C. is 5000 cSt or less and preferably 500 cSt or less. The component B includes, for example, a copolymer of organohydrogen siloxane of which both terminals are blocked with triorganosiloxane groups, a copolymer of diorganosiloxane and organohydrogensiloxane, tetraorgano tetrahydrogen cyclotetrasiloxane, a copolymerized polysiloxane composed of an $HR^1{}_2SiO$ 1/2 unit and an $SiO$ 4/2 unit, and a copolymerized cyclohaxane composed of a $HR^1{}_2SiO$ 1/2 unit, a $R^1{}_3SiO$ 1/2 unit and a $SiO$ 4/2 unit. In these formulas, $R^1$ has the same meaning as described above.

The components A and B are mixed together in such amounts that the molar ratio of the total amount of alkenyl groups on the silicon atoms of the component A to the total mount of hydrogen atoms directly bonded to the silicone atoms of the component B is in the range of 0.1 to 2.0 and preferably 0.1 to 1.0, resulting in the mixture being prepared. Then, the so-obtained mixture is cured by a curing reaction, leading to the silicone gel. The curing reaction may be generally carried out using a catalyst. For this purpose, a platinum catalyst is conveniently used. The platinum catalyst includes, for example, finely divided elemental platinum, chloroplatinic acid, platinum oxide, complex salts of olefin with platinum, platinum alcoholate and complex salts of vinylsiloxane with chloroplatinic acid. Such complex salts may be generally used in an amount of 0.1 ppm or more, in terms of elemental platinum, based on the total amount of the components A and B and preferably 0.5 ppm or more. The amount of platinum catalyst does not have any specific upper limit; however, if the catalyst is in the form of liquid or may be used in the form of solution, good results may be obtained when the catalyst is used in an amount of 200 ppm or less. The above-described component A, component B and catalyst are mixed together to prepare a mixture, which is then allowed to stand or heated, resulting in being cured, leading to the silicone gel used in the present invention.

The so-obtained silicone gel generally has a rate of penetration of approximately 5 to 250 when measured in accordance with JIS (Japanese Industrial Standard) K-2207-1980 (50 g load). The hardness of such a silicone gel may be adjusted by using the component A in an amount larger than the amount sufficient to form a crosslinked structure by the reaction with hydrogen atoms directly bonded to Si of the component B. Alternatively, the adjustment may be carried out by previously adding silicone oil having methyl groups at both terminals thereof in an amount of from 5 to 75 wt % based on the silicone gel to be prepared. The silicone gel may be adjusted as described above or may be commercially available. Commercially available silicone gel which may be used in the present invention includes silicone gels sold under the designations CF 5027, TOUGH-2, TOUGH-3, TOUGH-4, TOUGH-5, TOUGH-6 and TOUGH-7 from Kabushiki Kaisha Toray Dow Corning Silicone, Japan; silicone gel sold under the designation X-32-902/Cat1300 from Shin-Etsu Kagaku Kogyo Kabushiki Kaisha, Japan; silicone gel sold under the designation F250-121 from Nippon Yunika Kabushiki Kaisha, Japan; and the like.

In addition to the above-described component A, component B and catalyst, components such as a pigment, a curing delay agent, a flame retardant, a filler and the like may be added in amounts which do not cause deterioration of characteristics of the silicone gel. Further, a composite silicone gel material having a microballoon-like filler contained therein may be used. The composite silicone gel used includes, for example, Fillite (registered trademark) commercially available from Nippon Fillite Kabushiki Kaisha, Japan, Expancel (registered trademark) commercially available from Nippon Fillite Kabushiki Kaisha, Japan, Matsumoto Microsphere (trade name) commercially available from Matsumoto Yushi Seiyaku Kabushiki Kaisha, Japan, and the like. Good results may be obtained using a composite silicone gel material prepared by, for example, adding Expancel described above in an amount of 3 wt % to a base comprising CF 5027 described above of which a rate of penetration was adjusted to about 150. In the illustrated embodiment, TOUGH-7 described above of which a rate of penetration was adjusted to 190 was used. The silicone gel having a rate of penetration as high as, for example, about 160 is suitably used to eliminate a resonance phenomenon, whereas the silicone gel having a lower rate of penetration of, for example, 100 is particularly effective to improve settling time.

The above-described arrangement of the gel element 42 between a combination of the rotor magnet 34 and output shaft 22 and the rotor core 36 in the illustrated embodiment causes the gel element 42 to decrease a part of magnetic force of the rotor magnet 34. In order to avoid the problem, magnetic powders may be added to the gel element 42 to maintain the magnetic circuit.

Figure 5:
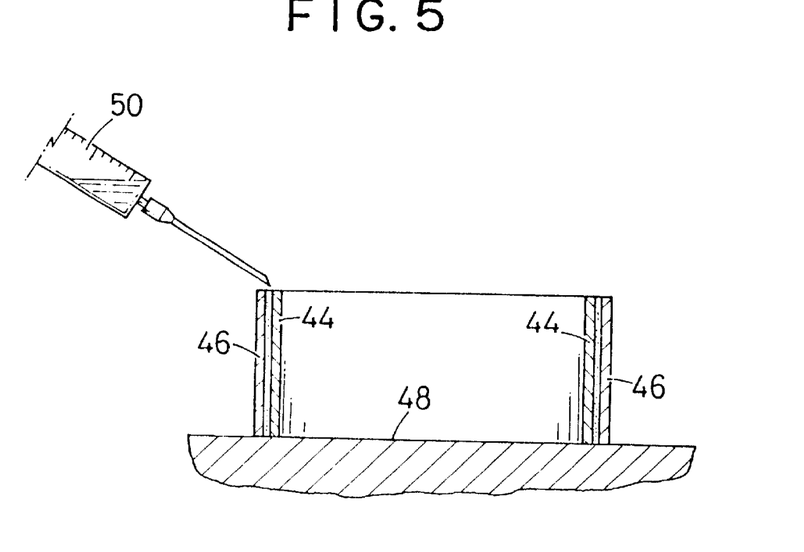
FIG. 5 is a schematic sectional view showing charging of a gel material in a sleeve structure for forming a gel element.

Now, the manner of arrangement of silicone gel serving as the gel element 42 between the casing 24 and the stator core 38 will be described hereinafter. In one method, the stepping motor is temporarily assembled while supporting the stator 28 in a manner to somewhat lift it. Subsequently, the uncured gel material is poured into the space or gap between the casing 24 and the stator core 38 and then cured by heating. Alternatively, the arrangement may be carried out as shown in FIG. 5. More particularly, an inner sleeve 46 and an outer sleeve 48 are combined on a surface plate 48 so as to define an annular gap or space therebetween and then the uncured silicone gel is poured into the gap by means of a syringe 50 to form an assembly comprising the sleeves and gel. Subsequently, the gel is cured and then the assembly is fitted on the stator core 38 through the inner sleeve 44. Thereafter, the casing 24 is fitted on the outer sleeve 46. Such assembling results in the outer sleeve 46 acting as or constituting a part of the casing 24 and the inner sleeve 44 acting as or constituting a part of the stator core 38. Also, the arrangement of the gel element in the manner described above does not change a conventional process for manufacturing a stepping motor and permits the mass production of the stepping motor by merely adding additional steps to the conventional process. Alternatively, only one of the inner and outer sleeves 44 and 46 may be used and fitted on the stator core 38 or in the casing 24. In this instance, the casing 24 or stator core 38 is substituted directly for the other of the inner and outer sleeves. Alternatively, a sleeve which is constructed so as to be divided may be used. In this instance, the arrangement of the gel element may be carried out by cutting the gel material previously formed into a sheet-like shape to form gel element pieces of a strip-like shape and then winding the pieces on the inner or outer periphery of the sleeve.

When it is required to strengthen bonding between the gel element 42 and the casing 24, stator core 38, inner sleeve 44 and/or outer sleeve 46, it is desirable to previously apply a silicone primer and/or a silicone adhesive of the addition reaction type on the surface of each of these members. As described in detail in Japanese Patent Application Laid-Open Publication No. 242774/1989 which discloses an invention made by the inventor, such a silicone primer includes, for example, Primer A (trade name) commercially available from Kabushiki Kaisha Toray Dow Corning Silicone, Japan, Primer Z-3042 commercially available from Bayer Gohsei Silicone Kabushiki Kaisha, Japan and the like. To the above-described silicone primer may be added a coupling agent such as triethoxysilane or the like. Also, the silicone adhesive of the addition reaction type may be applied after the silicone primer is coated, resulting in the bonding being more effectively improved. A silicone adhesive which performs addition reaction with the silicone gel by heating to cure the silicone gel may be used as such a silicone adhesive of the addition reaction type. The silicone adhesive used includes, for example, KE-1800T commercially available from Shin-Etsu Kagaku Kogyo Kabushiki Kaisha, Japan, SE-1700 commercially available from Kabushiki Kaisha Taray Dow Corning Silicone, Japan and the like. Further, as the silicone adhesive of the addition reaction type may be used a composition comprising such a mixture of diorganopolysiloxane and organohydrogen polysiloxane as described above wherein the molar ratio between the vinyl group of the organohydrogen polysiloxane and the hydrogen of Si—H bond of the organohydrogen polysiloxane is hydrogen-excessive. For example, a composition may be used in which the ratio between the vinyl group and the hydrogen of the Si—H bond is within the range between 1:1.05 to 1:2.02.

The uncured silicone gel is arranged on and contacted with the surface of each of the members to which the silicone primer and, if required, silicone adhesive are applied, and then the silicone gel is heated. This causes not only the silicone gel to be cured but the silicone primer and/or adhesive applied to the inner peripheral surface of the casing 24, the stator core 38 or the like acting as a support for the silicone gel to be reacted with the silicone gel to strengthen joining between the silicone gel and the peripheral cover section 38. When a composite silicone gel material in which a filler is contained is used for forming the gel element 32, it is desirable that an uncured silicone gel material free of a filler is first applied and then the filler containing the uncured silicone gel material is applied thereonto, which are then subject to curing by heating.

Figure 6:
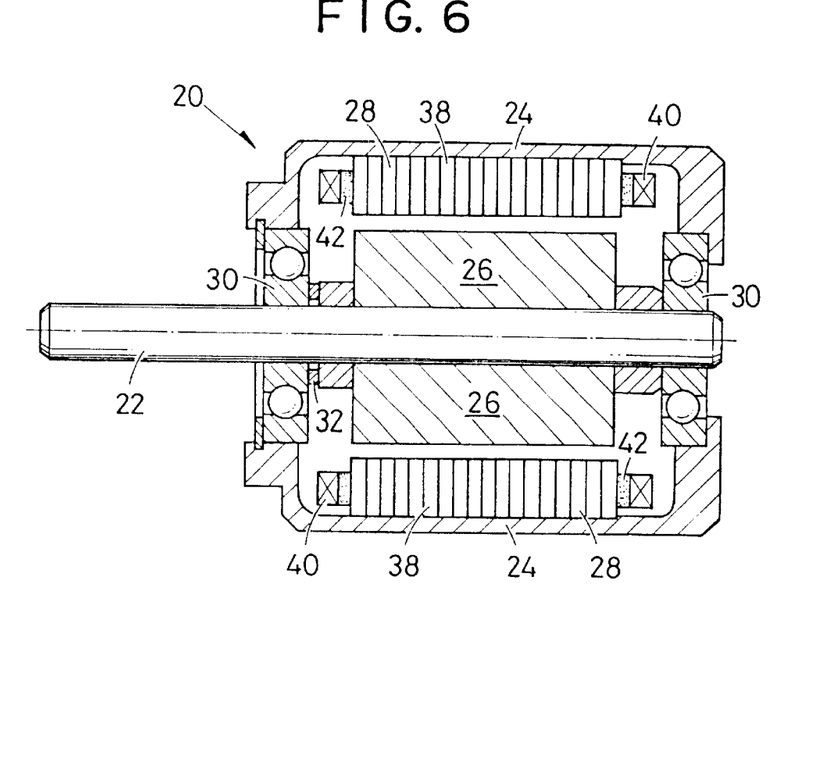
FIG. 6 is a vertical sectional side elevation view showing another embodiment of a stepping motor according to the present invention, which is embodied in the form of a PM type stepping motor including a laminated core structure.
Figure 7:
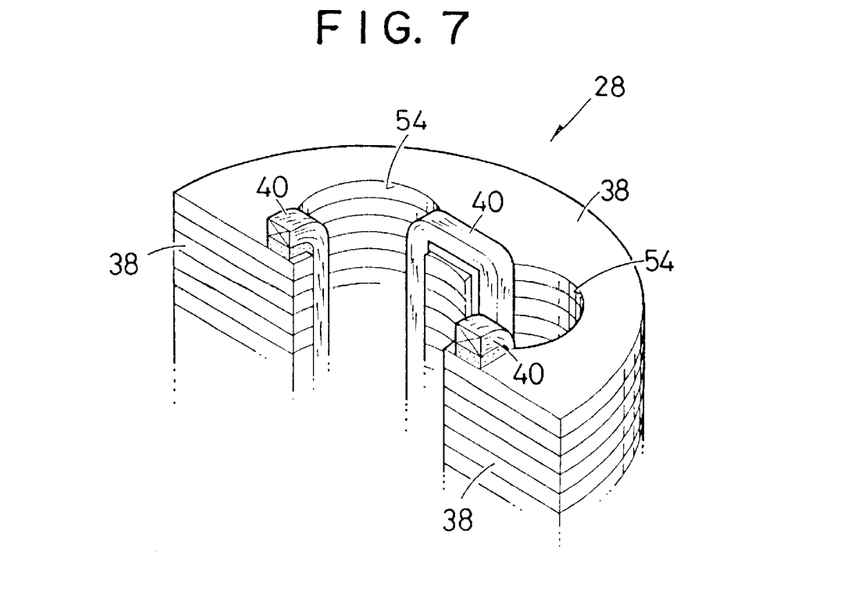
FIG. 7 is a fragmentary perspective view showing a stator arranged in the stepping motor of FIG. 6.
Figure 8:
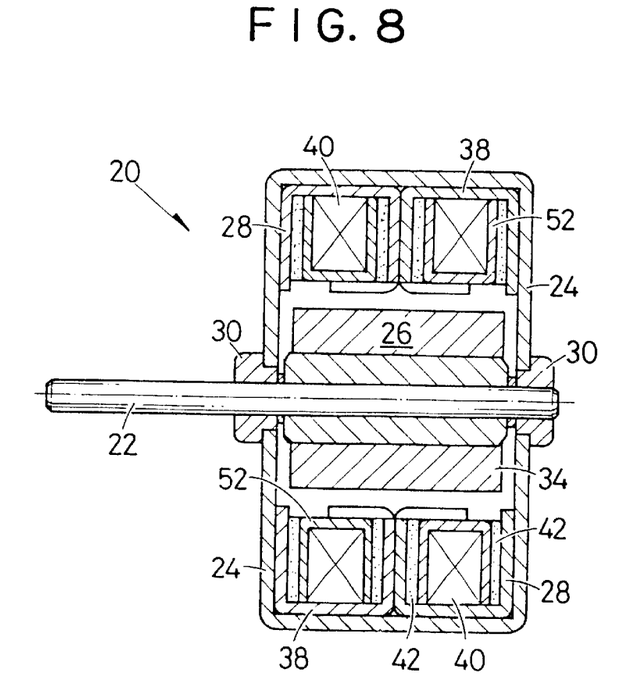
FIG. 8 is a vertical sectional side elevation view showing a further embodiment of a stepping motor according to the present invention, which is embodied in the form of a PM type stepping motor having a claw pawl structure.
Figure 9:
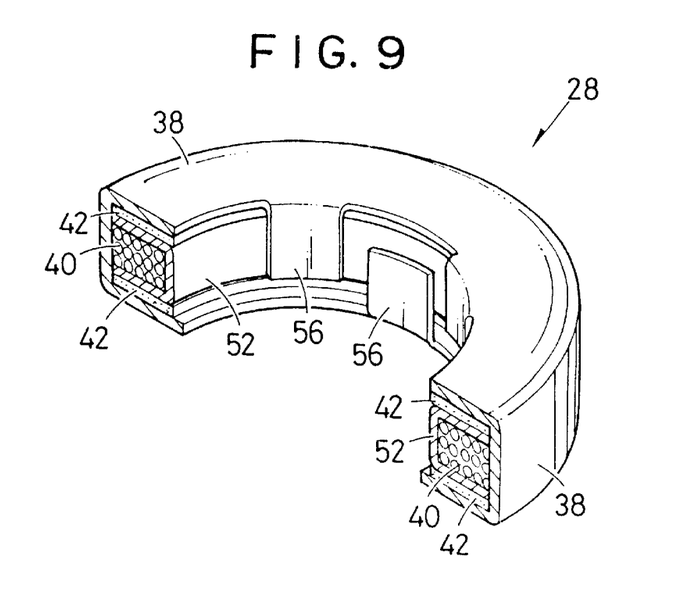
FIG. 9 is a fragmentary sectional perspective view showing a stator arranged in the stepping motor of FIG. 8.

Referring now to FIGS. 6 and 7 and FIGS. 8 and 9 showing further embodiments of a stepping motor according to the present invention, a stepping motor of each of the illustrated embodiments is embodied in the form of a PM type stepping motor. PM type stepping motors are generally classified as stepping motors of the laminated core type or structure and stepping motors of the claw pawl type or structure. The PM type stepping motor shown in FIGS. 6 and 7 is embodied as a PM type stepping motor of the laminated core structure. More particularly, the stepping motor of the embodiment of FIGS. 6 and 7 includes a casing 24, an output shaft 22 extending through the casing 24, a rotor 26 including a magnet connected to or mounted on the output shaft 22, and a stator 28 including a stator core 38 of the laminated type fixed on the inner surface of the casing 24 and excitation coils 40 wound on the stator core 38. The stepping motor 20 of the embodiment shown in FIGS. 8 and 9 is embodied in the form of a PM type stepping motor of the claw pawl structure. More particularly, the stepping motor 20 shown in FIGS. 8 and 9 includes a casing 24, an output shaft 22 extending through the casing 24 from the casing, a rotor 26 connected to the output shaft 22 and having a cylindrical surface of the multi-pole magnetized type, and two sets of stators 28 fixed on the inner surface of the casing 24 and each including an excitation coil 40 bifilar-wound in a coil bobbin 52 and a stator core 38 arranged outside the coil bobbin 52.

Now, the stators 28 of the respective types will be described hereinafter. In the stator of the laminated core structure, the excitation coils 40 each are wound between cutout-like slots 54 formed at the stator core 38 as shown in FIG. 7. Whereas, in the stator 28 of the claw pawl structure, the excitation coils 40 each are bifilar-wound in the coil bobbin 52 and the stator core 38 is arranged outside the coil bobbin 52 in a manner to be open in a direction opposite to a direction of opening of the coil bobbin 52. Then, stator pawls 56 provided on the upper and lower ends of the stator core 38 are bent so as to surround the coil bobbin 52.

Figure 10:
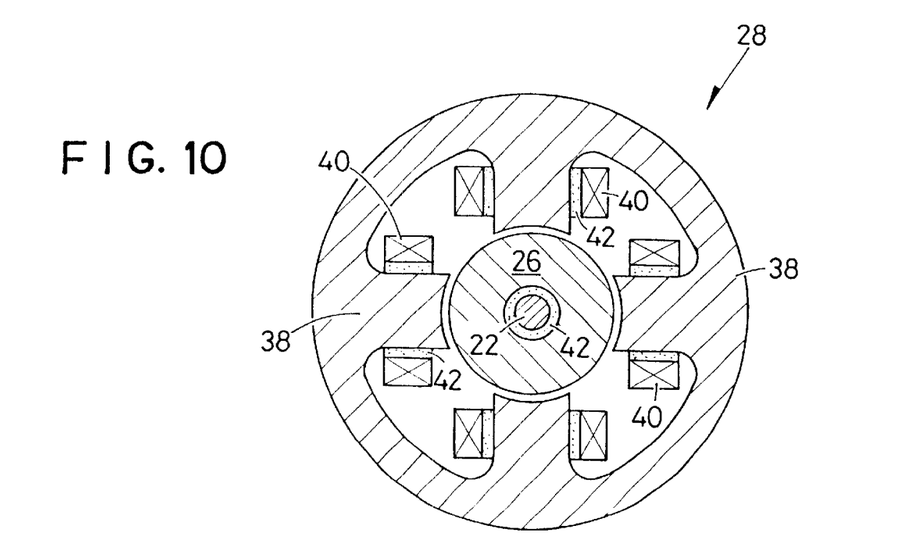
FIG. 10 is a cross sectional view showing the arrangement of a gel element between a rotor and an output shaft.

The arrangement of a gel element in the PM type stepping motor constructed as described above is carried out as shown in FIGS. 6 to 9. More particularly, in the stepping motor of the laminated core structure shown in FIGS. 6 and 7, a gel element 42 is arranged between the stator core 38 and each of the excitation coils 40 so as to serve as an inertia damper for absorbing vibration; whereas, in the stepping motor of the claw pawl structure shown in FIGS. 8 and 9, a gel element 42 is arranged between each of the coil bobbins 52 and each of the stator cores 38 for the same purpose. Now, the manner of arrangement of the gel element 42 between the the stator core 38 and the excitation coil 40 in the stepping motor of the laminated core structure will be exemplified. First, the stator core 38 and excitation coils 40 are arranged in place and then the uncured silicone gel described above is poured therebetween. Then, the silicone gel is cured by heating. Alternatively, the silicone gel cured into a sheet-like configuration is wound on the stator core 38 and then each of the excitation coils 40 is arranged on the silicone gel. Further, the gel element 42 acting as an inertia damper, as shown in FIG. 10, may be arranged between the rotor 26 comprising a permanent magnet and the output shaft 22 as well.

Thus, it will be noted that in each of the embodiments described above with reference to FIGS. 2 to 10, the gel element 42 is directly arranged between the casing 24 and the stator 28 and/or between the rotor 26 and the output shaft 22 because no interstitial element such as a reinforcing member or the like is used for arranging the gel element.

Figure 11:
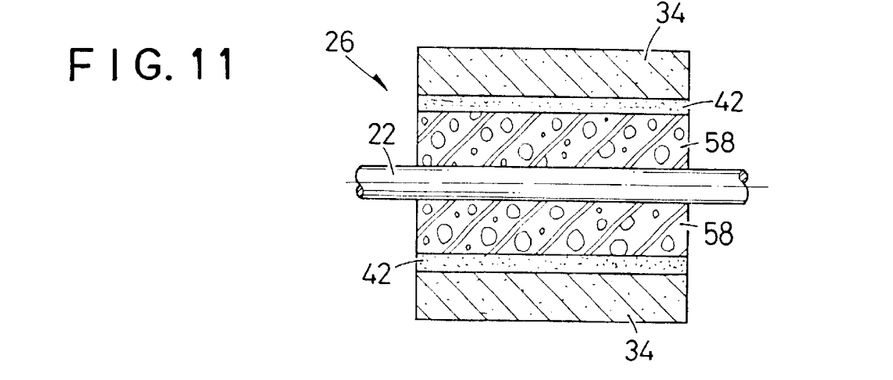
FIG. 11 is a vertical sectional side elevation view showing still another embodiment of a stepping motor according to the present invention.
Figure 12:
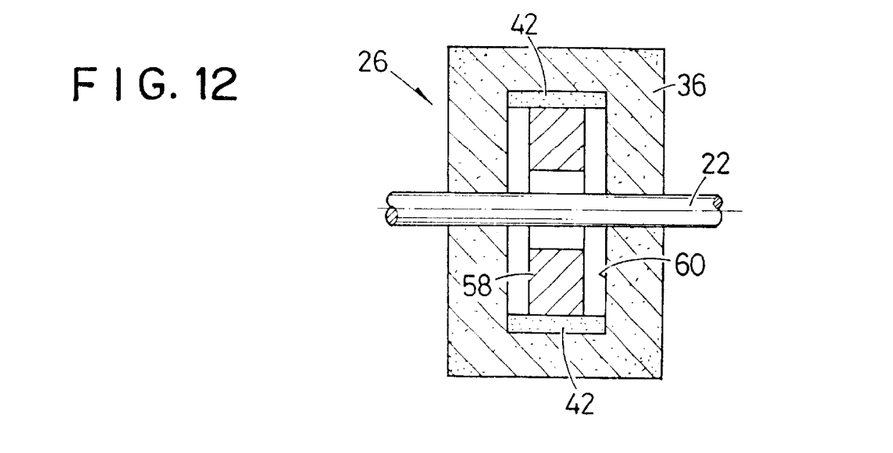
FIG. 12 is a vertical sectional side elevation view showing a still further embodiment of a stepping motor according to the present invention.

FIGS. 11 and 12 each show a further embodiment of a stepping motor according to the present invention. Each of the illustrated embodiments is so constructed that a gel element is indirectly arranged. More particularly, in the embodiment of FIG. 11, a rotor 26 comprises a rotor magnet 34 and a reinforcing member 58 acting as an interstitial element such as a bushing, a spacer or the like and interposed between the rotor magnet 34 and an output shaft 22. In the embodiment, the interstitial element 58 is directly mounted on the output shaft 22. Between the reinforcing member or interstitial element 58 and the rotor magnet 34 is arranged a gel element 42. Thus, it will be noted that in the embodiment, the gel element 42 is arranged indirectly in a whole space between the rotor and the output shaft 22 through the interstitial or intermediate element 58. The reinforcing member 58 is preferably made of a non-magnetic material. In the embodiment shown in FIG. 12, a rotor 26 comprises a rotor core 36 comprising a magnet or an iron core and formed with a hollow section and an interstitial element 58 arranged in the hollow section 60. In the embodiment, the interstitial element 58 is arranged so as to be spaced from an output shaft 22 and functions as an inertia element, resulting in the stepping motor exhibiting the function of an inertia damper as well. Also, the stepping motor of FIG. 12 includes a gel element 42 arranged between the rotor core 36 and the inertia or interstitial element 58. In the so-constructed embodiment of FIG. 12, the interstitial element or inertia element 58 may be constructed so as to act as an iron core or magnet as well. Thus, it will be noted that in the stepping motor shown in FIG. 12, the gel element 42 is inter-posed indirectly in a part of a space between the rotor 26 and the output shaft 22 through the interstitial or intermediate element 58 serving as the inertia element.

In each of the embodiments shown in FIGS. 11 and 12, a gel element 42 may be further arranged between a stator and a casing, for example, as in the embodiment described above with reference to FIGS. 2 to 4.

The stepping motor of the present invention is not limited to the above-described embodiments. The present invention may be likewise conveniently applied to the VR type stepping motor. Also, the gel element 42 is not limited to the above-described configurations and/or arrangements. For example, the gel element may be formed into a multi-layer laminate or divided.

As can be seen from the foregoing, the stepping motor of the present invention is so constructed that the stator, excitation coil, rotor and the like each serving as a mass element are coupled through the gel element to the support elements such as the casing, stator core, output shaft and the like. Thus, the elements function as an inertia damper for absorbing vibration as well. For example, such construction of the present invention allows vibration generated at the time of starting of the stepping motor to be effectively absorbed, resulting in such vibrations being rapidly converged. Also, this prevents rotation of the stepping motor from being stopped due to resonance at an intermediate frequency, to thereby permit an increase in rotation of the motor to be stably carried out. For example, an experiment conducted by the inventor revealed that the stepping motor of the present invention constructed in such a manner as shown in FIGS. 2 to 4 reduced trimming time to 26 msec, whereas the conventional stepping motor exhibited trimming time as long as 46 msec. The inventor conducted another experiment wherein load was applied to the stepping motor of FIGS. 2 to 4 and the above-described conventional inertia damper substantially according to the procedures of an endurance test conventionally practiced for evaluating an inertial damper. As a result, the conventional inertia damper broke when the application of load thereto was repeated 100,000 times, whereas the stepping motor of the present invention did not break although the application of load was repeated 1,000,000 times. Further, the stepping motor of the present invention eliminates a necessity of mounting thereon an inertia damper formed separate therefrom, is simplified in construction and does not deteriorate performance even when a person accidentally touches it.

While preferred embodiment of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A stepping motor comprising:

a casing;

an output shaft mounted in said casing and extending outwardly therefrom;

a rotor mounted in said casing and being fixed for rotation with said output shaft;

a stator mounted in said casing and being substantially stationarily fixed to said casing, said stator including at least one stator core and at least one excitation coil wound about said at least one stator core;

a first gel element interposed between said casing and at least a portion of said stator; and at least one second gel element interposed between said output shaft and at least a portion of said rotor.

2. A stepping motor as recited in claim 1, wherein said first gel element is interposed between said casing and said at least one stator core.

3. A stepping motor as recited in claim 2, wherein said rotor includes a rotor magnet fixed about said output shaft, and a pair of rotor cores substantially fixed for rotation with said output shaft and said rotor magnet and being respectively mounted around opposing ends of said rotor magnet; and said at least one second gel element is interposed between said rotor magnet and each of said rotor cores.

4. A stepping motor as recited in claim 3, wherein said at least one second gel element is further interposed directly between said output shaft and each of said rotor cores at positions axially outwardly of said opposing ends of said rotor magnet, respectively.

5. A stepping motor as recited in claim 1, wherein said first gel element is interposed between said at least one stator core and said at least one excitation coil.

6. A stepping motor as recited in claim 5, wherein said rotor includes a rotor magnet fixed about said output shaft, and a pair of rotor cores substantially fixed for rotation with said output shaft and said rotor magnet and being respectively mounted around opposing ends of said rotor magnet; and said at least one second gel element is interposed between said rotor magnet and each of said rotor cores.

7. A stepping motor as recited in claim 6, wherein said at least one second gel element is further interposed directly between said output shaft and each of said rotor cores at positions axially outwardly of said opposing ends of said rotor magnet, respectively.

8. A stepping motor as recited in claim 1, wherein said rotor includes a rotor magnet fixed about said output shaft, and a pair of rotor cores substantially fixed for rotation with said output shaft and said rotor magnet and being respectively mounted around opposing ends of said rotor magnet; and said at least one second gel element is interposed between said rotor magnet and each of said rotor cores.

9. A stepping motor as recited in claim 8, wherein said at least one second gel element is further interposed directly between said output shaft and each of said rotor cores at positions axially outwardly of said opposing ends of said rotor magnet, respectively.

10. A stepping motor comprising:

a casing;

an output shaft mounted in said casing and extending outwardly therefrom;

a rotor mounted in said casing and being fixed for rotation with said output shaft, said rotor including a rotor magnet fixed about said output shaft, and a pair of rotor cores substantially fixed for rotation with said output shaft and said rotor magnet and being respectively mounted around opposing ends of said rotor magnet;

a stator mounted in said casing and being substantially stationarily fixed to said casing, said stator including at least one stator core and at least one excitation coil wound about said at least one stator core; and at least one gel element interposed between said rotor magnet and each of said rotor cores.

11. A stepping motor as recited in claim 10, wherein said at least one gel element is further interposed directly between said output shaft and each of said rotor cores at positions axially outwardly of said opposing ends of said rotor magnet, respectively.

12. A stepping motor comprising:

a casing;

an output shaft mounted in said casing and extending outwardly therefrom;

a rotor mounted in said casing and being fixed for rotation with said output shaft;

a stator mounted in said casing and being substantially stationarily fixed to said casing, said stator including a stator core, a coil bobbin mounted in said stator core and an excitation coil wound on said coil bobbin; and a gel element interposed between said stator core and said coil bobbin.

13. A stepping motor as recited in claim 12, wherein in cross section, said stator core has a U-shape opening in a first direction and said coil bobbin has a U-shape opening in a second direction opposite said first direction, such that said stator core and said coil bobbin together surround said excitation coil.

14. A stepping motor comprising:

a casing;

an output shaft mounted in said casing and extending outwardly therefrom;

a rotor mounted in said casing and being fixed for rotation with said output shaft, said rotor comprising an axially elongated rotor magnet mounted about said output shaft and substantially fixed for rotation with said output shaft, an axially elongated interstitial element fixed for rotation with said output shaft and interposed between said output shaft and said rotor magnet;

a stator mounted in said casing and being substantially stationarily fixed to said casing, said stator including at least one stator core and at least one excitation coil wound about said at least one stator core; and an axially elongated gel element interposed radially between an outer periphery of said interstitial element and an inner periphery of said rotor magnet.

15. A stepping motor comprising:

a casing;

an output shaft mounted in said casing and extending outwardly therefrom;

a rotor mounted in said casing and being fixed for rotation with said output shaft, said rotor comprising a hollow rotor core mounted about said output shaft and fixed for rotation with said output shaft, and an interstitial element mounted within said hollow rotor core, about said output shaft and substantially fixed for rotation with said hollow rotor core;

a stator mounted in said casing and being substantially stationarily fixed to said casing, said stator including at least one stator core and at least one excitation coil wound about said at least one stator core; and a gel element interposed radially between an outer periphery of said interstitial element and an inner periphery of said hollow rotor core.

16. A stepping motor as recited in claim 15, wherein said interstitial element comprises an inertial element.

17. A stepping motor as recited in claim 15, wherein said hollow rotor core comprises a magnet or iron core.

18. A stepping motor as recited in claim 15, wherein said interstitial element comprises a magnet or iron core.

19. A stepping motor as recited in claim 14, wherein said axially elongated interstitial element is disposed radially between said output shaft and said rotor magnet.

20. A stepping motor as recited in claim 1, wherein said rotor comprises a rotor core and a rotor magnet; and said at least one second gel element is disposed radially between said output shaft and said rotor core.

* * * * *